United States Patent
Hatakeyama et al.

(10) Patent No.: US 11,208,509 B2
(45) Date of Patent: Dec. 28, 2021

(54) POLYMER COMPOUND FOR CONDUCTIVE POLYMER AND METHOD FOR PRODUCING SAME

(71) Applicant: SHIN-ETSU CHEMICAL CO., LTD., Tokyo (JP)

(72) Inventors: Jun Hatakeyama, Joetsu (JP); Takayuki Fujiwara, Joetsu (JP); Koji Hasegawa, Joetsu (JP); Takayuki Nagasawa, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/886,856

(22) Filed: May 29, 2020

(65) Prior Publication Data
US 2020/0291145 A1 Sep. 17, 2020

Related U.S. Application Data

(63) Continuation of application No. 15/877,771, filed on Jan. 23, 2018, now Pat. No. 10,851,188.

(30) Foreign Application Priority Data
Feb. 22, 2017 (JP) .............................. JP2017-031208

(51) Int. Cl.
*C08F 20/58* (2006.01)
*H01B 1/12* (2006.01)
(Continued)

(52) U.S. Cl.
CPC .............. *C08F 20/58* (2013.01); *C08F 20/38* (2013.01); *C08F 212/14* (2013.01); *C08F 212/20* (2020.02); *C08F 212/22* (2020.02); *C08F 212/24* (2020.02); *C08F 212/30* (2020.02); *C08F 220/36* (2013.01); *C08F 220/38* (2013.01); *C08F 220/58* (2013.01); *C08F 220/585* (2020.02); *C08L 25/18* (2013.01); *C08L 33/26* (2013.01); *H01B 1/125* (2013.01);
(Continued)

(58) Field of Classification Search
None
See application file for complete search history.

(56) References Cited

U.S. PATENT DOCUMENTS 4,528,118 A 7/1985 Murase et al.
5,043,195 A 8/1991 Skrivseth
(Continued)

FOREIGN PATENT DOCUMENTS

JP 2007-86615 A 4/2007
JP 2007-326903 A 12/2007
(Continued)

OTHER PUBLICATIONS

English text machine translation of Kanda (JP 2007-326903 A); Patent Translate for Description and Claims accessed online from Espacenet; PDF pp. 1-85 attached. (Year: 2007).*
(Continued)

*Primary Examiner* — Katie L. Hammer
(74) *Attorney, Agent, or Firm* — Oliff PLC

(57) ABSTRACT

A polymer compound having a weight average molecular weight in the range of 1,000 to 500,000, and contains one or more repeating units represented by formula (1) and one or more repeating units represented by formula (2):

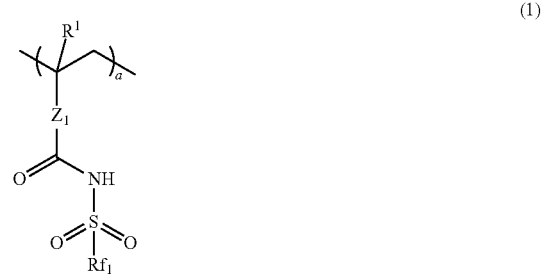

$R^1$ represents a hydrogen atom or a methyl group;
$Rf_1$ represents a linear or branched alkyl group having 1 to 4 carbon atoms or a phenyl group, and has at least one fluorine atom or a trifluoromethyl group in $Rf_1$;
$Z_1$ represents a single bond, an arylene group having 6 to 12 carbon atoms or $-C(=O)-O-R^2-$;
$R^2$ represents a linear, branched or cyclic alkylene group having 1 to 12 carbon atoms, an arylene group having 6 to 10 carbon atoms or an alkenylene group having 2 to 10 carbon atoms, and may have an ether group, a carbonyl group or an ester group in $R^2$; and
"a" is $0 < a \le 1.0$, and

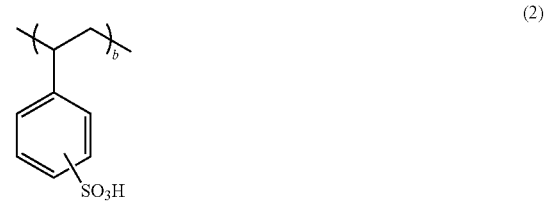

"b" is $0 < b < 1.0$.

3 Claims, No Drawings

(51) Int. Cl.

| | |
|---|---|
| *C08F 20/38* | (2006.01) |
| *C08F 220/38* | (2006.01) |
| *C08F 212/14* | (2006.01) |
| *C08F 220/58* | (2006.01) |
| *C08F 220/36* | (2006.01) |
| *C08L 25/18* | (2006.01) |
| *C08L 33/26* | (2006.01) |
| *C08F 12/30* | (2006.01) |
| *C08F 12/20* | (2006.01) |
| *C08F 12/24* | (2006.01) |
| *C08F 12/22* | (2006.01) |

(52) U.S. Cl.
CPC .............. *C08F 12/20* (2013.01); *C08F 12/22* (2013.01); *C08F 12/24* (2013.01); *C08F 12/30* (2013.01); *C08F 2800/10* (2013.01)

(56) References Cited

U.S. PATENT DOCUMENTS

| | | | |
|---|---|---|---|
| 5,609,983 A | 3/1997 | Kawamura et al. | |
| 5,962,546 A | 10/1999 | Everaerts et al. | |
| 6,319,428 B1 | 11/2001 | Michot et al. | |
| 6,476,114 B2 | 11/2002 | Goeman et al. | |
| 8,057,708 B2 | 11/2011 | Hsu | |
| 2004/0106708 A1 | 6/2004 | Mizumoto et al. | |
| 2008/0193773 A1 | 8/2008 | Hsu et al. | |
| 2013/0015071 A1 | 1/2013 | Willis | |
| 2015/0337064 A1 | 11/2015 | Yang et al. | |

FOREIGN PATENT DOCUMENTS

| | | |
|---|---|---|
| JP | 2008-146913 A | 6/2008 |
| JP | 6264723 B2 | 8/2013 |

OTHER PUBLICATIONS

U.S. Appl. No. 15/877,891, filed Jan. 23, 2018 in the name of Jun Hatakeyama et al.
Apr. 4, 2019 Office Action issued in U.S. Appl. No. 15/877,891.
Nov. 19, 2019 Notification of Reasons for Refusal issued in Japanese Patent Application No. 2017-031208.
Patent Translate for Kanda (JP 2007-326903 A), English text machine translation of the Description and Claims accessed from Espacenet website; copy attached as a PDF pp. 1-85. (Year: 2007).
Aug. 28, 2020 Notice of Allowance Issued in U.S. Appl. No. 15/877,771.

\* cited by examiner

POLYMER COMPOUND FOR CONDUCTIVE POLYMER AND METHOD FOR PRODUCING SAME

CROSS-REFERENCE TO RELATED APPLICATIONS

This is a Continuation of application Ser. No. 15/877,771 filed Jan. 23, 2018, which claims priority to JP 2017-31208 filed Feb. 22, 2017. The disclosure of each of the prior applications is hereby incorporated by reference herein in its entirety.

TECHNICAL FIELD

The present invention relates to a polymer compound for a conductive polymer and a method for producing the same.

BACKGROUND ART

A sulfo group-containing polymer has been used as a dopant polymer of a fuel cell or a conductive polymer. Vinyl perfluoroalkyl ether sulfonic acid represented by Nafion® has widely been used for fuel cells and polymers of vinyl sulfonic acid or styrene sulfonic acid have widely been used as dopant polymers for conductive polymers (Patent Document 1). Also, in Patent Document 2, a fluorinated acid polymer in which a proton is substituted by a cation has been proposed as a dopant polymer, and a dopant of a styrene derivative having a lithium salt of bisfluoroalkylsulfonylimide has been shown therein.

Although vinyl perfluoroalkyl ether sulfonic acid has chemically high stability and is excellent in durability, its glass transition point is low, and when the fuel cell using the same is exposed to a high temperature, there is a problem that the polymer undergoes heat flow whereby ion conductivity is lowered. In addition, the styrene derivative having bisfluoroalkylsulfonylimide has the similar problem. In order to enhance the ion conductivity, a super strong acid polymer represented by a sulfo group fluorinated at the α-position is effective, but along with this, a material having a high glass transition point and being chemically stable has not yet been found out.

Conductive polymers having conjugated double bonds such as polythiophene, polyaniline, and polypyrrole themselves do not show conductivity, but conductivity is developed by doping with a strong acid such as sulfonic acid. Polystyrenesulfonic acid (PSS) has been most frequently used as a dopant. This is because the conductivity becomes the highest by doping the PSS.

The PSS is a water-soluble resin and hardly soluble in an organic solvent. Accordingly, the polythiophene using the PSS as a dopant is also water-soluble.

The polythiophene using the PSS as a dopant has high conductivity and high transparency, so that it is expected to be a conductive film for organic EL lighting replacing ITO (indium-tin oxide). However, a luminous body of an organic EL chemically changes due to moisture and does not emit light. That is, when a conductive film of a water-soluble resin is used for an organic EL, the resin contains water, so that there is a problem that the emission lifetime of the organic EL is shortened.

PRIOR ART DOCUMENTS

Patent Documents

Patent Document 1: Japanese Patent Application Publication No. 2008-146913
Patent Document 2: Japanese Patent No. 5264723

SUMMARY OF INVENTION

Technical Problem

The present invention has been made in view of the above circumstances, and an object thereof is to provide a polymer compound for a conductive polymer, which is soluble in an organic solvent and suitably used as a dopant for a fuel cell or a conductive material. Another object of the present invention is to provide a method for producing such a polymer compound for a conductive polymer.

Solution to Problem

In order to solve the problems, the present invention is to provide a polymer compound for a conductive polymer comprising one or more kinds of repeating units "a" represented by the following general formula (1) and having a weight average molecular weight in the range of 1,000 to 500,000,

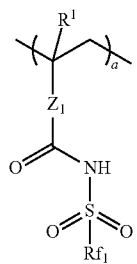

(1)

wherein, $R^1$ represents a hydrogen atom or a methyl group; $Rf_1$ represents a linear or branched alkyl group having 1 to 4 carbon atoms or a phenyl group, and has at least one fluorine atom or a trifluoromethyl group in $Rf_1$; $Z_1$ represents a single bond, an arylene group having 6 to 12 carbon atoms or —C(=O)—O—$R^2$—; $R^2$ represents a linear, branched or cyclic alkylene group having 1 to 12 carbon atoms, an arylene group having 6 to 10 carbon atoms or an alkenylene group having 2 to 10 carbon atoms, and may have an ether group, a carbonyl group or an ester group in $R^2$; and "a" is $0<a\leq1.0$.

When such a polymer compound for a conductive polymer is employed, it becomes a polymer compound for a conductive polymer which is soluble in an organic solvent and has a sulfonamide group of a specific strong acid suitably used as a dopant for a fuel cell or a conductive material.

At this time, the polymer compound for a conductive polymer preferably further contains a repeating unit "b" represented by the following general formula (2),

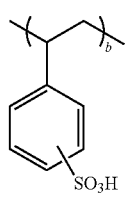

(2)

wherein, "b" is $0<b<1.0$.

When the repeating unit "a" is copolymerized with the repeating unit "b" of the polystyrenesulfonic acid, it can be used as a dopant polymer having high conductivity.

At this time, the repeating unit "a" represented by the general formula (1) preferably contains one or more kinds of repeating units selected from the repeating units "$a_1$" to "$a_4$" represented by the following general formula (3),

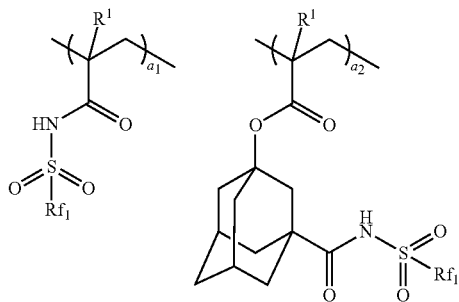

(3)

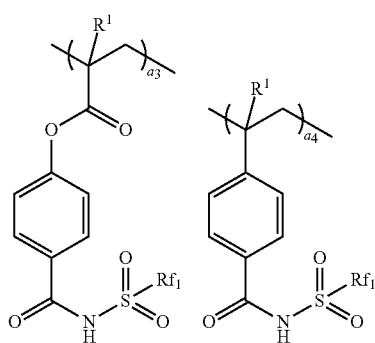

wherein, $R^1$ and $Rf_1$ have the same meanings as defined above; and "$a_1$", "$a_2$", "$a_3$", and "$a_4$" are $0 \leq a_1 \leq 1.0$, $0 \leq a_2 \leq 1.0$, $0 \leq a_3 \leq 1.0$, $0 \leq a_4 \leq 1.0$ and $0 < a_1+a_2+a_3+a_4 \leq 1.0$.

When such a repeating unit is employed, it becomes more suitable material as a dopant for a fuel cell or a conductive material.

Further, the present invention is to provide a method for producing the polymer compound for a conductive polymer, which comprises subjecting to polymerization reaction using a monomer having a structure of a salt comprising a sulfonamide group bonded to a carbonyl group and lithium, sodium, potassium, or a nitrogen compound, and after the polymerization, changing the structure of the salt comprising the sulfonamide group bonded to a carbonyl group and lithium, sodium, potassium, or the nitrogen compound to a sulfonamide group bonded to a carbonyl group by ion exchange, to produce a polymer compound for a conductive polymer containing a repeating unit "a" represented by the following general formula (1),

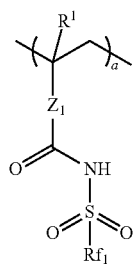

(1)

wherein, $R^1$ represents a hydrogen atom or a methyl group; $Rf_1$ represents a linear or branched alkyl group having 1 to 4 carbon atoms or a phenyl group, and has at least one fluorine atom or a trifluoromethyl group in $Rf_1$; $Z_1$ represents a single bond, an arylene group having 6 to 12 carbon atoms or —C(=O)—O—$R^2$—; $R^2$ represents a linear, branched or cyclic alkylene group having 1 to 12 carbon atoms, an arylene group having 6 to 10 carbon atoms or an alkenylene group having 2 to 10 carbon atoms, and may have an ether group, a carbonyl group or an ester group in $R^2$; and "a" is $0 < a \leq 1.0$.

When such a method for producing is employed, the polymer compound for a conductive polymer having the repeating unit "a" represented by the general formula (1) can be produced easily.

At this time, it is preferable that the polymer obtained by subjecting to the polymerization reaction using the monomer having the structure of the salt comprising the sulfonamide group bonded to a carbonyl group and lithium, sodium, potassium, or the nitrogen compound contains a repeating unit represented by the following general formula (4),

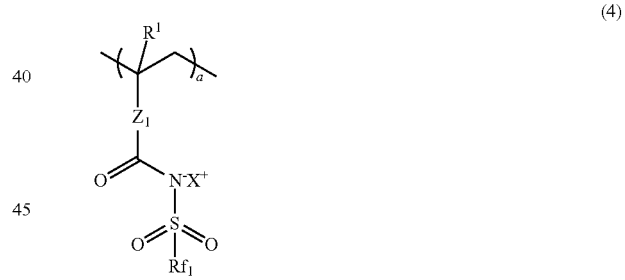

(4)

wherein, $R^1$, $Z_1$, $Rf_1$, and "a" have the same meanings as defined above, and X represents lithium, sodium, potassium, or a nitrogen compound represented by the following general formula (5),

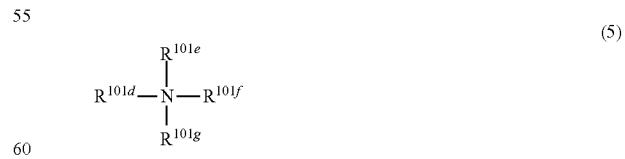

(5)

wherein, $R^{101d}$, $R^{101e}$, $R^{101f}$, and $R^{101g}$ each represent a hydrogen atom, or a linear, branched or cyclic alkyl group, alkenyl group, oxoalkyl group or oxoalkenyl group each having 1 to 12 carbon atoms, an aryl group having 6 to 20 carbon atoms, or an aralkyl group or an aryloxoalkyl group each having 7 to 12 carbon atoms, and a part or whole of the hydrogen atoms of these groups may be substituted by alkoxy groups; $R^{101d}$ and $R^{101e}$, or $R^{101d}$, $R^{101e}$ and $R^{101f}$ may form a ring, and when a ring is formed, $R^{101d}$ and $R^{101e}$, or $R^{101d}$, $R^{101e}$ and $R^{101f}$ represent an alkylene group having 3 to 10 carbon atoms or a heteroaromatic ring having the nitrogen atom in the formula in the ring.

When such a repeating unit is employed, it can be easily changed to the repeating unit "a" represented by the general formula (1) by ion exchange.

Advantageous Effects of Invention

According to the polymer compound for a conductive polymer of the present invention, it becomes a polymer compound for a conductive polymer having a sulfonamide group of a specific strong acid, which is soluble in an organic solvent and can be suitably used as a dopant for a fuel cell or a conductive material.

By using the polymer compound for a conductive polymer for a fuel cell, a material for a fuel cell having high dielectric constant can be formed. In addition, by using it as a dopant for a polymer having conjugated double bonds, it is possible to form a conductive film having high transparency, high conductivity and high durability. Further, the polymer compound for a conductive polymer of the present invention has a specific sulfonamide group. The sulfonamide group has a structure having a sulfone group to which a fluorinated alkyl group or phenyl group is bonded at one side, and a carbonyl group at the other side. Due to the electron withdrawing effect of the groups on both sides, the acidity of the sulfonamide group is higher than that of sulfonamide which has a sulfone group to which a fluoroalkyl group is bonded only on one side, and lower than that of sulfonic acid in which the α-position is fluorinated. If an acidity of the dopant polymer is high, due to strong ionic bonding by a strong acid, it becomes a material having high ability as a dopant, high stability as an ion, and high luminous efficiency. On the other hand, if the acidity of the dopant polymer is too high, the emission lifetime as the organic EL becomes short. This is considered that the acid migrates to the luminescent layer during luminescence and causes an exchange reaction with the ligand of the metal to be the luminous body. By applying the composite of the polymer compound for a conductive polymer of the present invention and the polymer having conjugated double bonds, it is possible to achieve both high efficiency and high lifetime of the organic EL.

In addition, according to the method for producing of the present invention, such a polymer compound for a conductive polymer of the present invention can be produced easily.

DESCRIPTION OF EMBODIMENTS

It has been desired to develop a polymer compound for a conductive polymer which is soluble in an organic solvent and can be suitably used as a dopant for a fuel cell or a conductive material.

The present inventors have tried to develop a polymer for a dopant which has high solubility in an organic solvent from the polystyrenesulfonic acid which is a dopant with water soluble and hardly soluble in an organic solvent, for the purpose of preventing deterioration of the device by changing the water soluble conductive polymer containing moisture which causes deterioration of the device of the organic EL to an organic solvent soluble type containing extremely little amount of the moisture content. For increasing solubility in an organic solvent, it is effective to introduce a long chain alkyl group or a fluorine atom, so that the inventors have investigated to introduce a fluorine atom. However, it was found that introduction of a long chain alkyl group or an excessive fluorine atom causes lowering in conductivity whereby it is not preferable so that the inventors aimed to construct a strongly acidic unit by introducing fewer fluorine atoms. The bisfluoroalkylsulfonylimide has high acidity, but it has fluoroalkyl groups on both sides so that the conductivity is low when it is applied to a dopant polymer. Thus, the present inventors have found that when a fluoroalkylsulfonyl group on one side of the bisfluoroalkylsulfonylimide is changed to a carbonyl group, a sulfonamide group having a sufficiently high acidity can be obtained with a small fluorine atom due to the electron withdrawing property of the carbonyl group.

The dopant polymer forms a composite with a polymer having conjugated double bonds, and the conductivity is improved by ionizing a part of the polymer having conjugated double bonds. As the acidity of the dopant polymer higher, the polymer having conjugated double bonds can be ionized, and the luminous efficiency of the organic EL is improved.

On the other hand, in order to prevent decrease in luminous intensity at the time of light emission of an organic EL, it is necessary to relieve excessive acidic condition which causes deterioration of lifetime. Since α-fluorinated sulfonic acid and bisfluoroalkylsulfonylimide are super strong acids, proton transfer occurs from the positive electrode layer to which the conductive polymer is applied to the light emitting layer during the light emission, which lowers the luminous efficiency whereby the luminosity lowers. To prevent this phenomenon, it is necessary to lower the acidity of the dopant polymer.

Thus, the present inventors have found that when a polymer compound containing a repeating unit having the sulfonamide group is used as a dopant for a polymer having conjugated double bonds, both high efficiency and a long lifetime of the organic EL can be achieved, whereby they have accomplished the present invention.

That is, the present invention is directed to a polymer compound for a conductive polymer, and the polymer compound for a conductive polymer contains one or more kinds of repeating units "a" represented by the following general formula (1) and has a weight average molecular weight in the range of 1,000 to 500,000,

(1)

wherein, $R^1$ represents a hydrogen atom or a methyl group; $Rf_1$ represents a linear or branched alkyl group having 1 to 4 carbon atoms or a phenyl group, and has at least one fluorine atom or a trifluoromethyl group in $Rf_1$; $Z_1$ represents a single bond, an arylene group having 6 to 12 carbon atoms or —C(=O)—O—$R^2$—; $R^2$ represents a linear, branched or cyclic alkylene group having 1 to 12 carbon atoms, an arylene group having 6 to 10 carbon atoms or an alkenylene group having 2 to 10 carbon atoms, and may have an ether group, a carbonyl group or an ester group in $R^2$; and "a" is 0<a≤1.0.

In the following, the present invention is explained in detail, but the present invention is not limited by these.

In the present invention, "conductivity" means "electroconductivity".

In addition, in the present invention, "a", "$a_1$" to "$a_4$", "b", and "c" each represent a ratio of the repeating units in the molecule.

The polymer compound for a conductive polymer of the present invention is a polymer containing the repeating unit "a" represented by the following general formula (1). The polymer compound for a conductive polymer of the present invention becomes a material having particularly high transparency by containing the repeating unit "a" represented by the general formula (1),

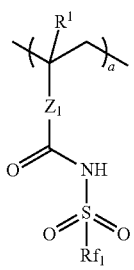

(1)

wherein, $R^1$ represents a hydrogen atom or a methyl group; $Rf_1$ represents a linear or branched alkyl group having 1 to 4 carbon atoms or a phenyl group, and has at least one fluorine atom or a trifluoromethyl group in $Rf_1$; $Z_1$ represents a single bond, an arylene group having 6 to 12 carbon atoms or —C(=O)—O—$R^2$—; $R^2$ represents a linear, branched or cyclic alkylene group having 1 to 12 carbon atoms, an arylene group having 6 to 10 carbon atoms or an alkenylene group having 2 to 10 carbon atoms, and may have an ether group, a carbonyl group or an ester group in $R^2$; and "a" is 0<a≤1.0.

In the general formula (1), $R^1$ represents a hydrogen atom or a methyl group.

$Rf_1$ represents a linear or branched alkyl group having 1 to 4 carbon atoms or a phenyl group, and has at least one fluorine atom or a trifluoromethyl group in $Rf_1$.

$Z_1$ represents a single bond, an arylene group having 6 to 12 carbon atoms or —C(=O)—O—$R^2$—, $R^2$ represents a linear, branched or cyclic alkylene group having 1 to 12 carbon atoms, an arylene group having 6 to 10 carbon atoms or an alkenylene group having 2 to 10 carbon atoms, and may have an ether group, a carbonyl group or an ester group in $R^2$. $R^2$ is preferably shown a methylene group, an ethylene group, an adamantylene group, and a phenylene group.

"a" is 0<a≤1.0.

Also, the repeating unit "a" represented by the general formula (1) preferably contains the repeating units "$a_1$" to "$a_4$" represented by the following general formula (3),

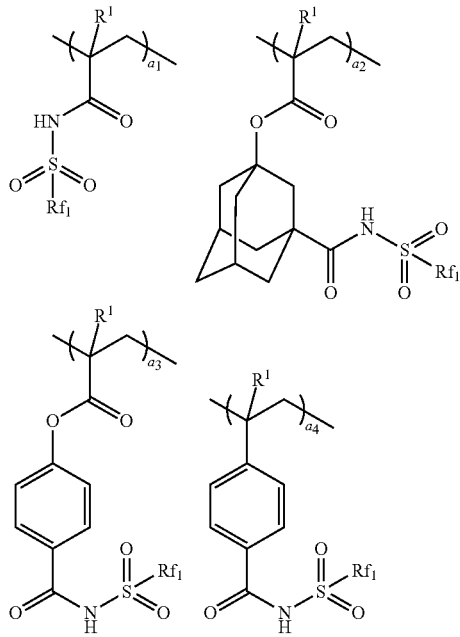

(3)

wherein, $R^1$ and $Rf_1$ have the same meanings as defined above; and "$a_1$", "$a_2$", "$a_3$", and "$a_4$" are 0≤$a_1$≤1.0, 0≤$a_2$≤1.0, 0≤$a_3$≤1.0, 0≤$a_4$≤1.0 and 0<$a_1$+$a_2$+$a_3$+$a_4$≤1.0.

When such a repeating unit is employed, the resulting material becomes further suitable as a dopant for a fuel cell or a conductive material.

In addition, the polymer compound for a conductive polymer of the present invention preferably further contains a repeating unit "b" represented by the following general formula (2). When a polymer compound is a material in which the repeating unit "a" is copolymerized with the repeating unit "b" of polystyrenesulfonic acid, it can be used as a dopant polymer having high conductivity,

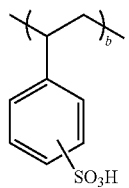

(2)

wherein, "b" is 0<b<1.0.

In addition, the polymer compound for a conductive polymer of the present invention may contain a repeating unit "c" other than the repeating unit "a", and the repeating unit "b" as shown later.

The polymer compound for a conductive polymer of the present invention is a material having a weight average molecular weight in the range of 1,000 to 500,000, preferably 2,000 to 200,000. If the weight average molecular weight is less than 1,000, the product is inferior in heat resistance. On the other hand, if the weight average molecular weight exceeds 500,000, the viscosity is increased to worsen workability, and solubility in water or an organic solvent is lowered.

The weight average molecular weight (Mw) is a measured value in terms of polystyrene, by gel permeation chromatography (GPC) using water, dimethylformamide (DMF), or tetrahydrofuran (THF) as a solvent.

When the polymer compound for a conductive polymer of the present invention is employed, it becomes a polymer compound for a conductive polymer having a sulfonamide group of a specific strong acid, which is soluble in an organic solvent and can be suitably used as a dopant for a fuel cell or a conductive material.

In addition, the present invention is to provide a method for producing such a polymer compound for a conductive polymer of the present invention.

That is, the method for producing of the present invention is a method for producing the polymer compound for a conductive polymer, which comprises subjecting to polymerization reaction using a monomer having a structure of a salt comprising a sulfonamide group bonded to a carbonyl group and lithium, sodium, potassium, or a nitrogen compound, and after the polymerization, changing the structure of the salt comprising the sulfonamide group bonded to a carbonyl group and lithium, sodium, potassium, or the nitrogen compound to a sulfonamide group bonded to a carbonyl group by ion exchange, to produce a polymer compound for a conductive polymer containing one or more repeating units "a" represented by the following general formula (1),

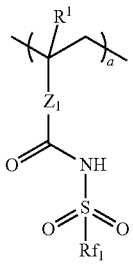

(1)

wherein, $R^1$ represents a hydrogen atom or a methyl group; $Rf_1$ represents a linear or branched alkyl group having 1 to 4 carbon atoms or a phenyl group, and has at least one fluorine atom or a trifluoromethyl group in $Rf_1$; $Z_1$ represents a single bond, an arylene group having 6 to 12 carbon atoms or —C(=O)—O—$R^2$—; $R^2$ represents a linear, branched or cyclic alkylene group having 1 to 12 carbon atoms, an arylene group having 6 to 10 carbon atoms or an alkenylene group having 2 to 10 carbon atoms, and may have an ether group, a carbonyl group or an ester group in $R^2$; and "a" is $0<a≤1.0$.

Here, the polymer obtained by subjecting to the polymerization reaction using the monomer having the structure of the salt comprising the sulfonamide group bonded to a carbonyl group and lithium, sodium, potassium, or the nitrogen compound preferably contains a repeating unit represented by the following general formula (4),

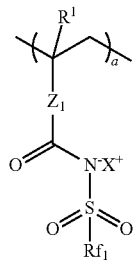

(4)

wherein, $R^1$, $Z_1$, $Rf_1$, and "a" have the same meanings as defined above, X represents lithium, sodium, potassium, or a nitrogen compound represented by the following general formula (5),

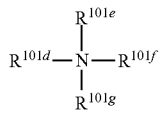

(5)

wherein, $R^{101d}$, $R^{101e}$, $R^{101f}$, and $R^{101g}$ each represent a hydrogen atom, or a linear, branched or cyclic alkyl group, alkenyl group, oxoalkyl group or oxoalkenyl group each having 1 to 12 carbon atoms, an aryl group having 6 to 20 carbon atoms, or an aralkyl group or an aryloxoalkyl group each having 7 to 12 carbon atoms, and a part or whole of the hydrogen atoms of these groups may be substituted by alkoxy groups; $R^{101d}$ and $R^{101e}$, or $R^{101d}$, $R^{101e}$ and $R^{101f}$ may form a ring, and when a ring is formed, $R^{101d}$ and $R^{101e}$, or $R^{101d}$, $R^{101e}$ and $R^{101f}$ represent an alkylene group having 3 to 10 carbon atoms or a heteroaromatic ring having a nitrogen atom in the formula in the ring.

When such a repeating unit is introduced, it is preferable since it is easily changed to the repeating unit "a" represented by the general formula (1) by ion-exchange.

The monomer having the structure of the salt comprising the sulfonamide group and lithium, sodium, potassium, or the nitrogen compound, and for obtaining the repeating unit "a" represented by the general formula (1) to be used for the method for producing of the present invention may be specifically exemplified by the following.

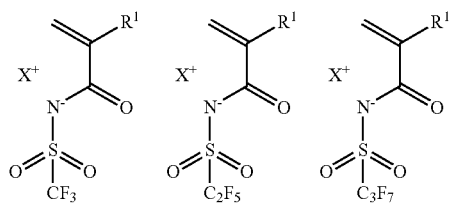

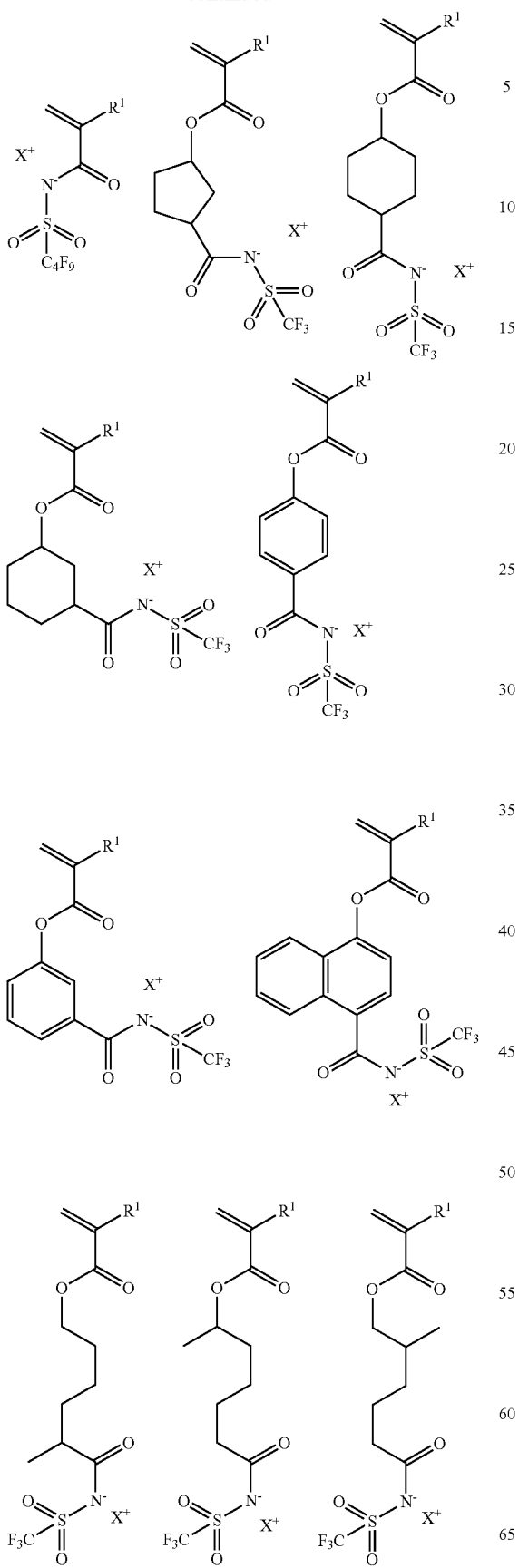
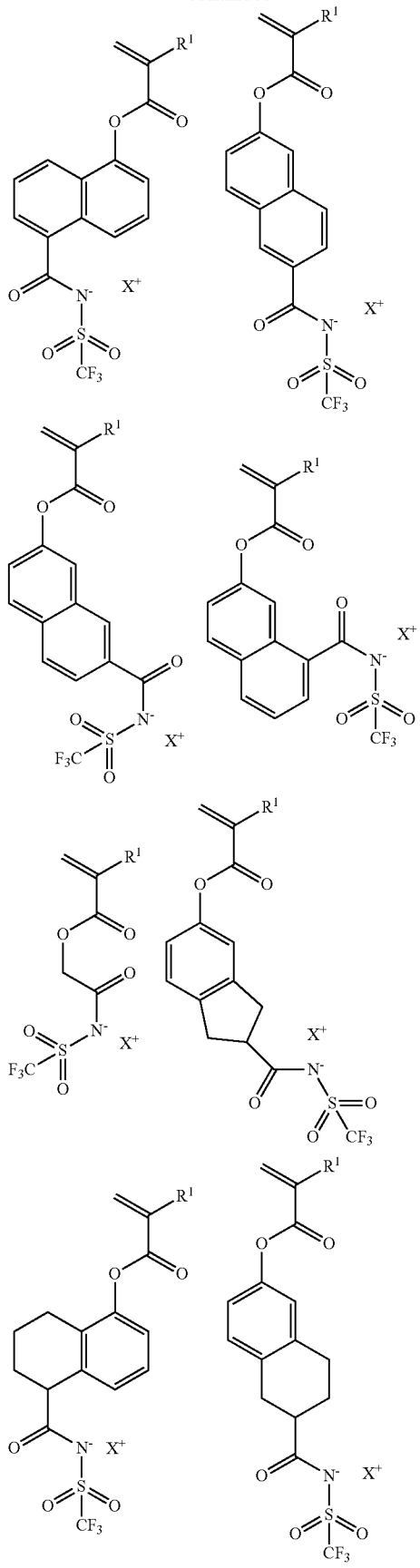

-continued
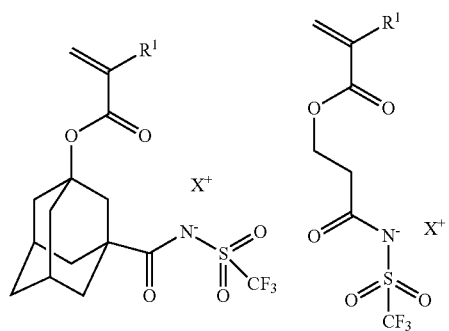
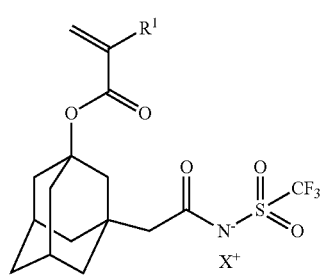
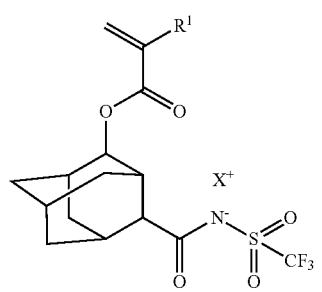
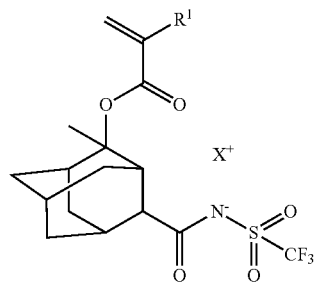
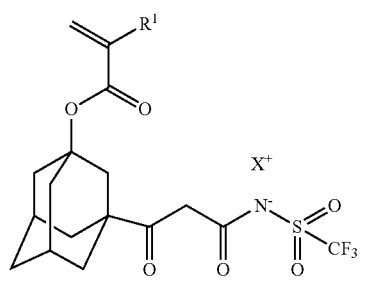
-continued
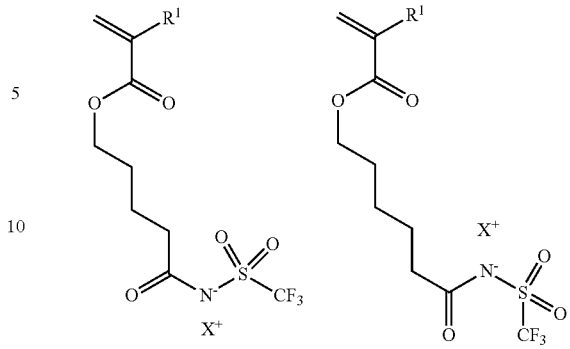
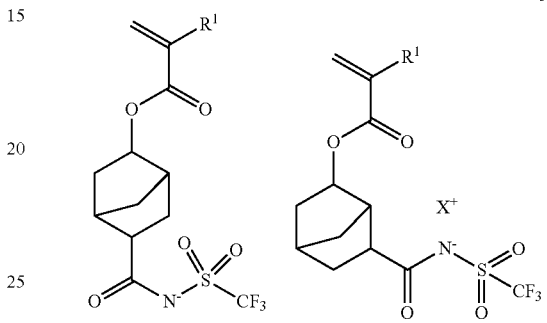
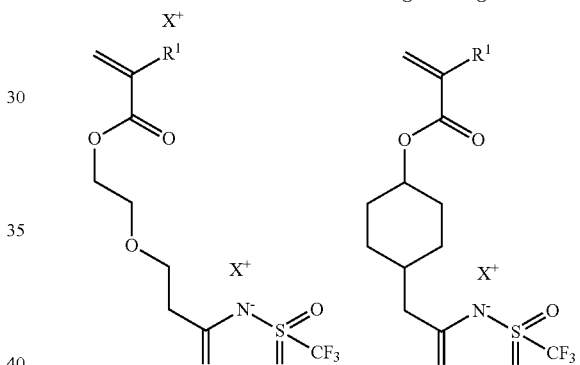
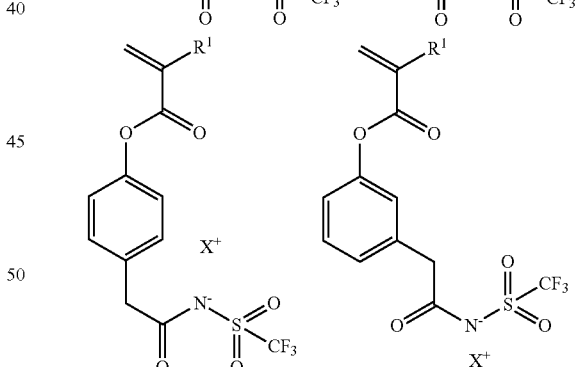
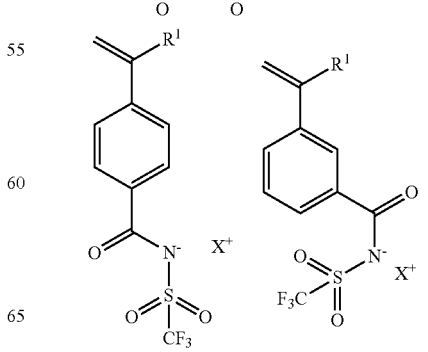

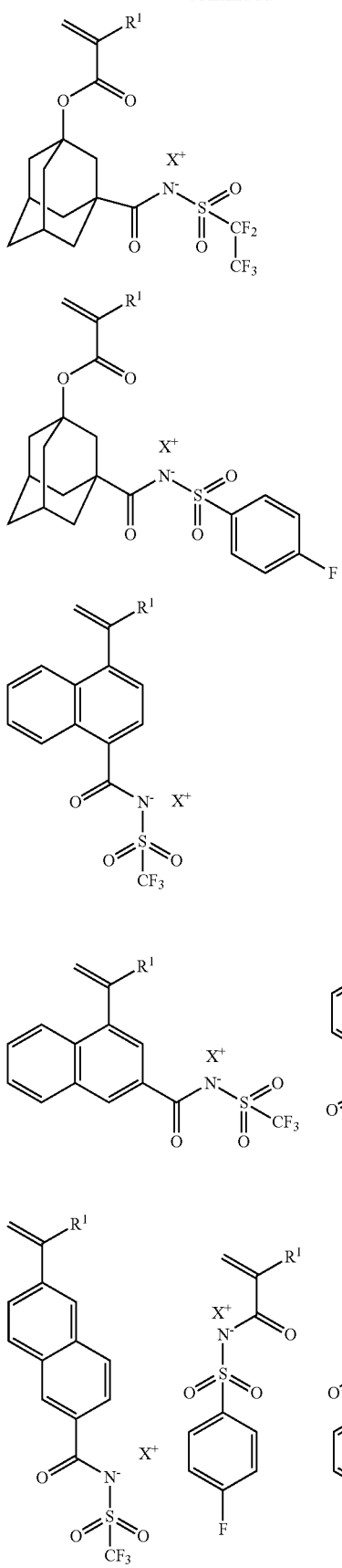

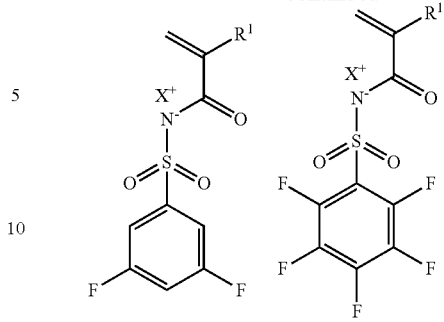

wherein, $R^1$ has the same meaning as defined above; and X represents lithium, sodium, potassium, or a nitrogen compound.

In addition, the repeating unit "a" represented by the general formula (1) preferably contains repeating units "$a_1$" to "$a_4$" represented by the general formula (3) mentioned above.

Moreover, the polymer compound for a conductive polymer of the present invention is preferably a material containing the repeating unit "b" represented by the general formula (2), and a monomer to obtain such a repeating unit "b" may be specifically exemplified by the following compounds:

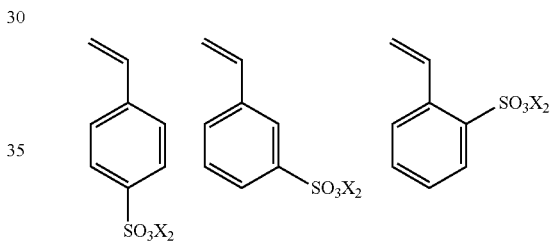

wherein, $X_2$ represents a hydrogen atom, lithium, sodium, potassium, a nitrogen compound, or a sulfonium compound.

As examples of the case where the $X_2$ is a nitrogen compound, there may be shown a compound represented by the following general formula (5),

(5)

wherein, $R^{101d}$, $R^{101e}$, $R^{101f}$, and $R^{101g}$ each represent a hydrogen atom, or a linear, branched or cyclic alkyl group, alkenyl group, oxoalkyl group or oxoalkenyl group each having 1 to 12 carbon atoms, an aryl group having 6 to 20 carbon atoms, or an aralkyl group or an aryloxoalkyl group each having 7 to 12 carbon atoms, and a part or whole of the hydrogen atoms of these groups may be substituted by alkoxy groups; $R^{101d}$ and $R^{101e}$, or $R^{101d}$, $R^{101e}$ and $R^{101f}$ may form a ring, and when a ring is formed, $R^{101d}$ and $R^{101e}$, or $R^{101d}$, $R^{101e}$ and $R^{101f}$ represent an alkylene group having 3 to 10 carbon atoms or a heteroaromatic ring having the nitrogen atom in the formula in the ring.

The polymer compound for a conductive polymer of the present invention may contain a repeating unit "c" other than the repeating unit "a", and the repeating unit "b", and a monomer for obtaining the repeating unit "c" may be shown a (meth)acrylic-based, styrene-based, vinylnaphthalene-based, vinylsilane-based, acenaphthylene, indene, and vinylcarbazole, as well as a monomer having a silicon atom(s) or a fluorine atom(s).

The monomer providing the repeating unit "c" may be specifically exemplified by the following:

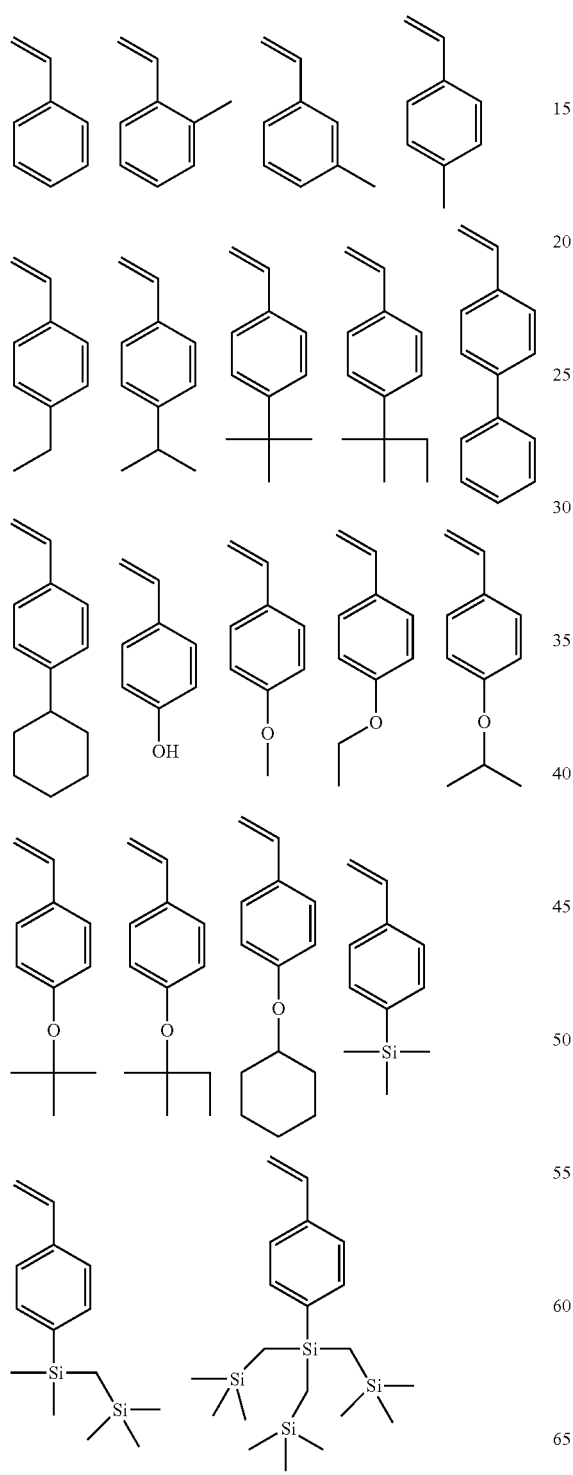

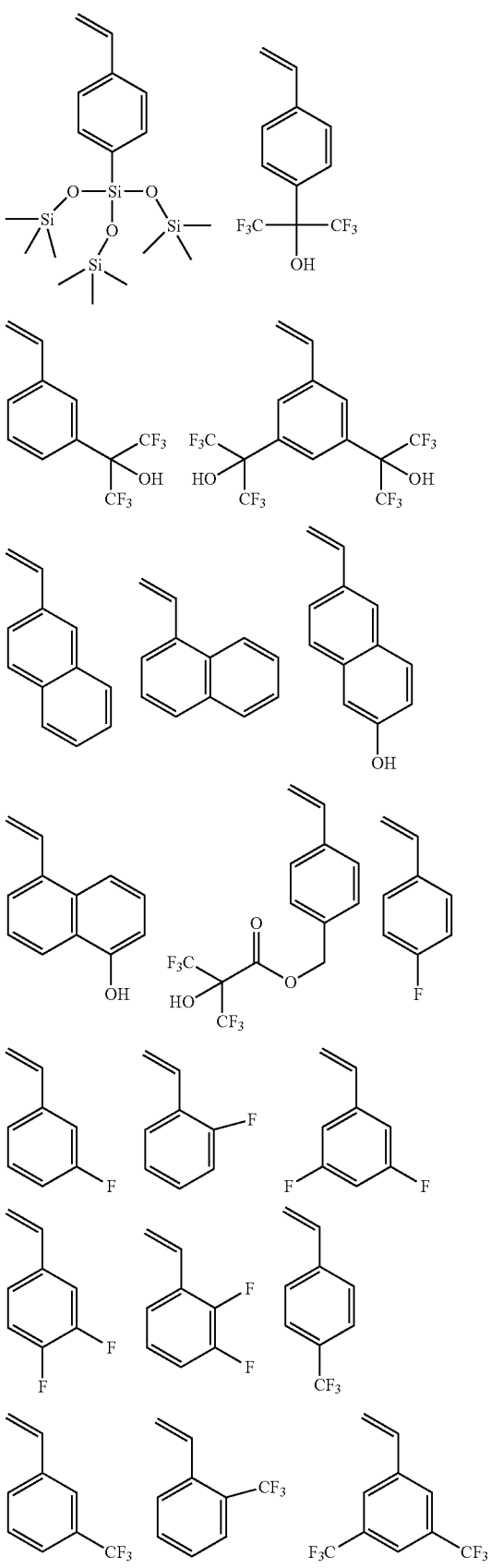

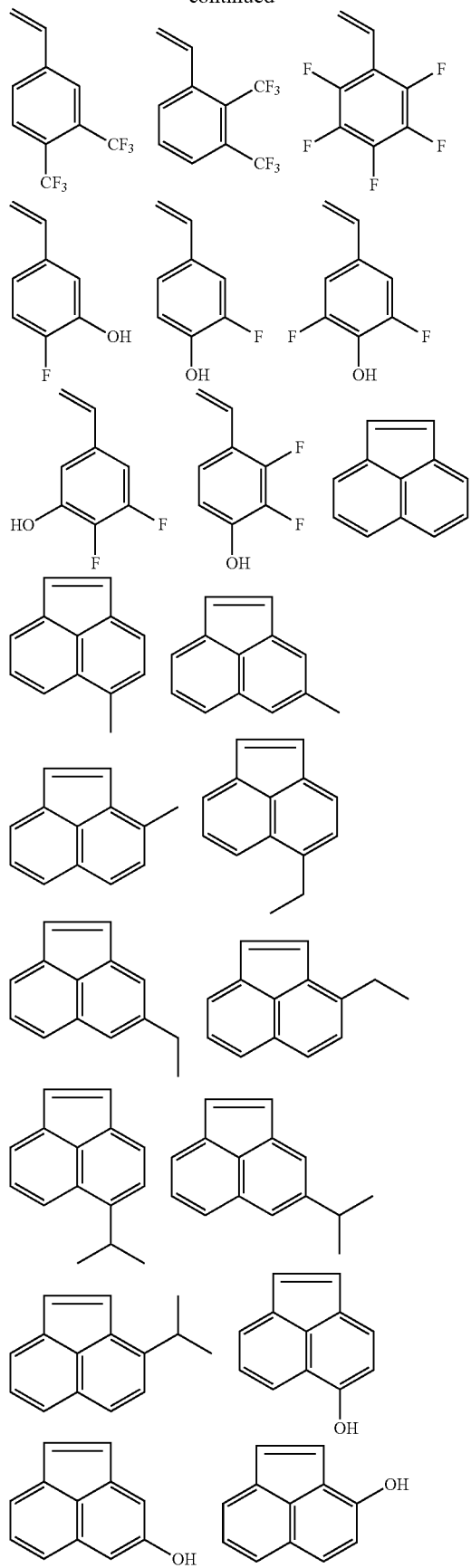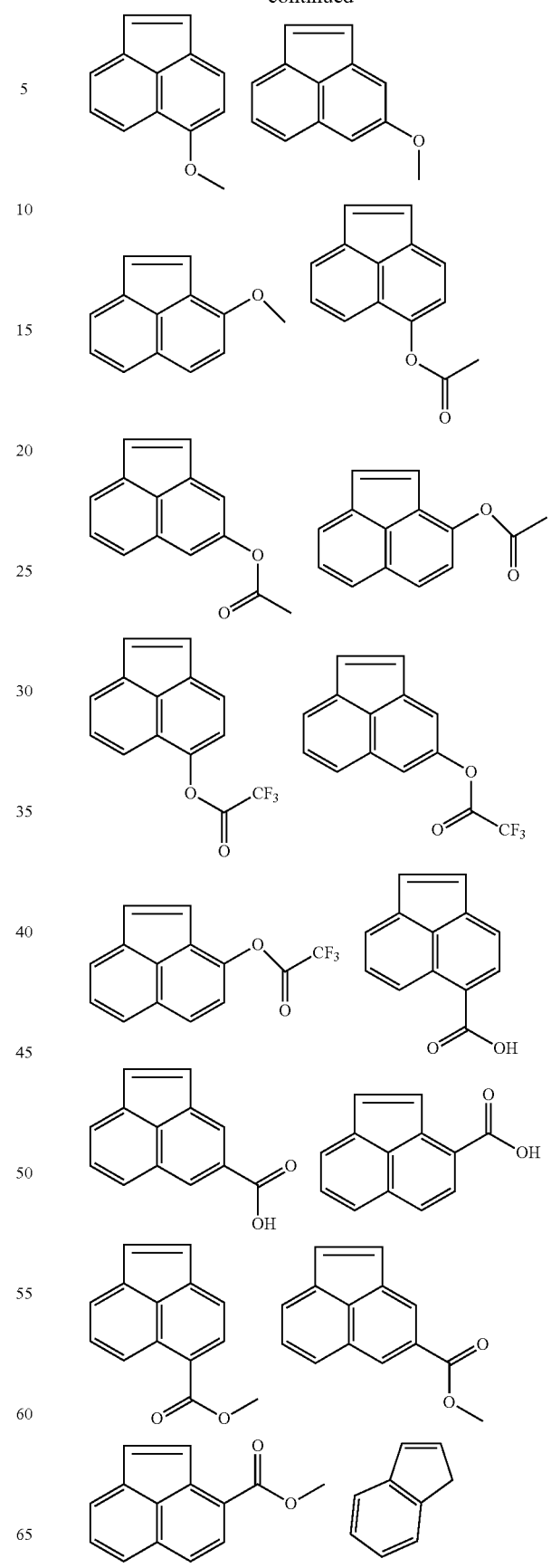

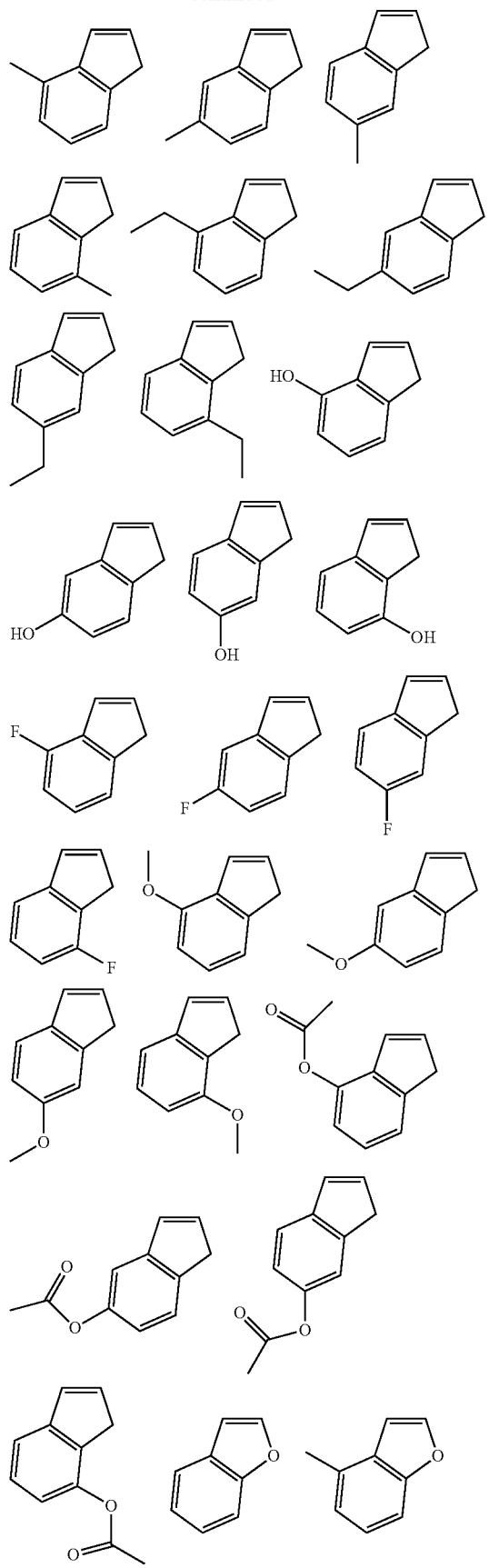
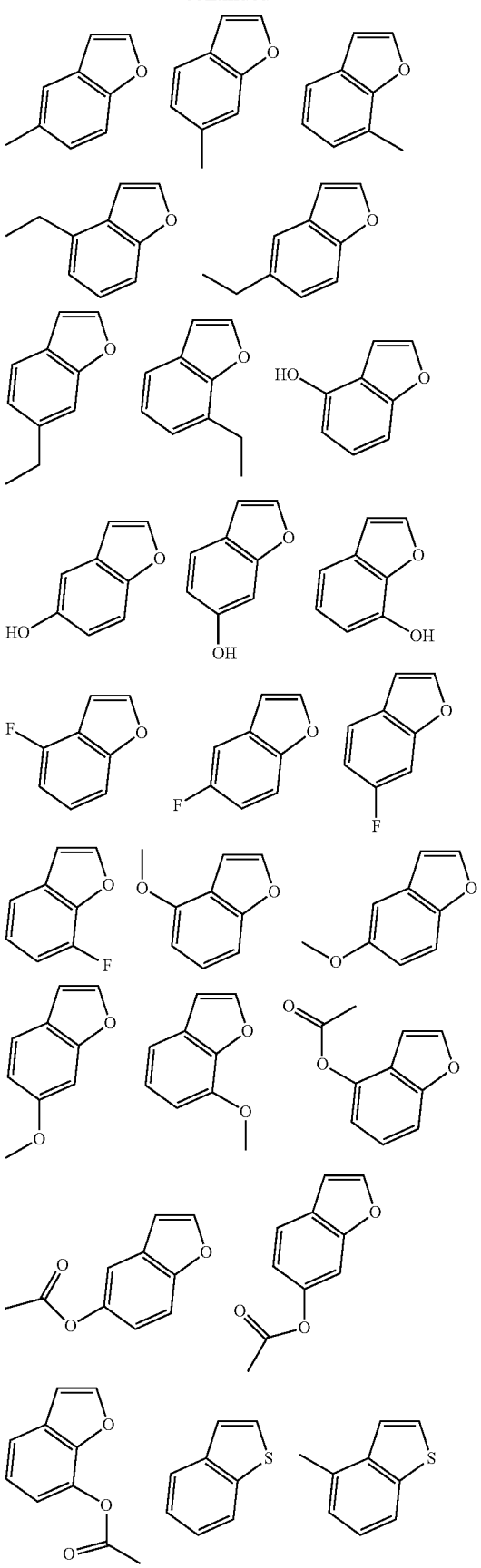

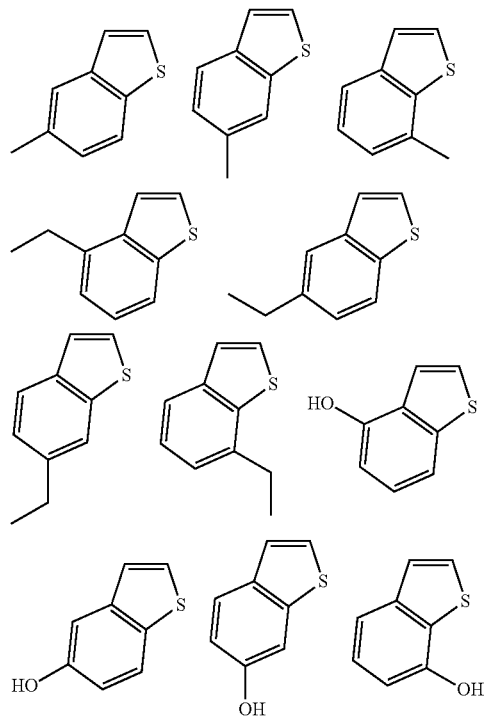
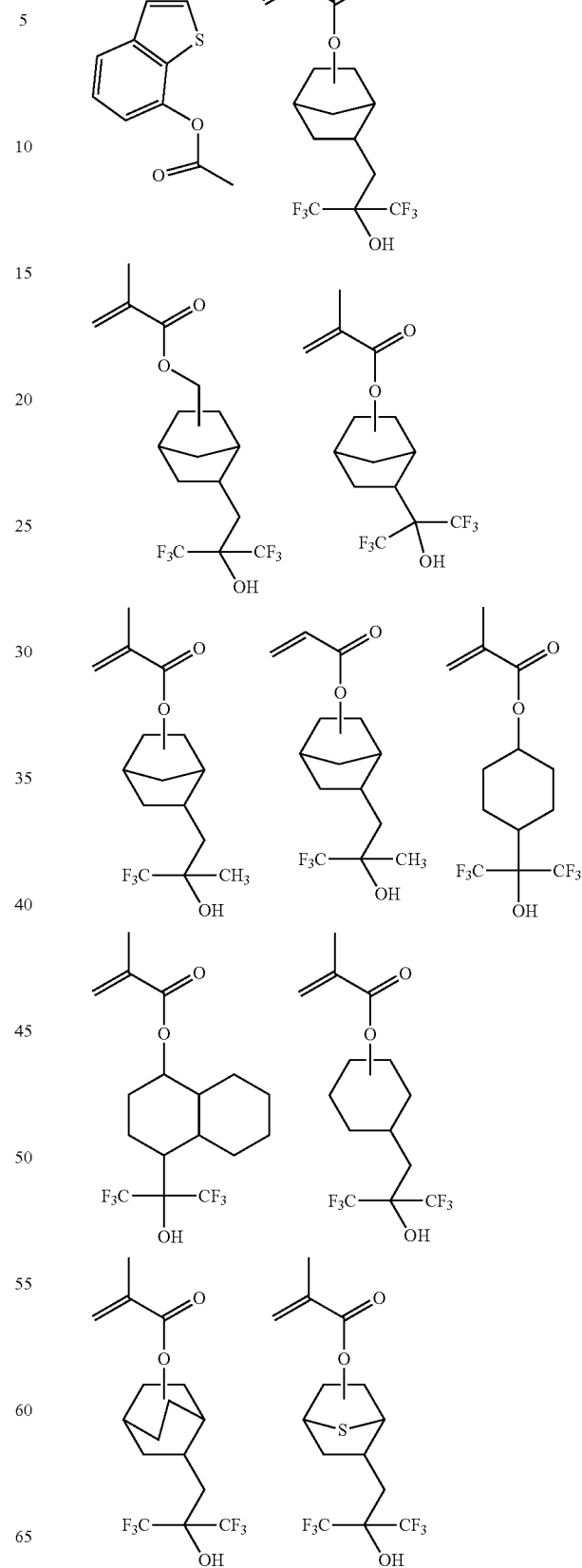

25
-continued
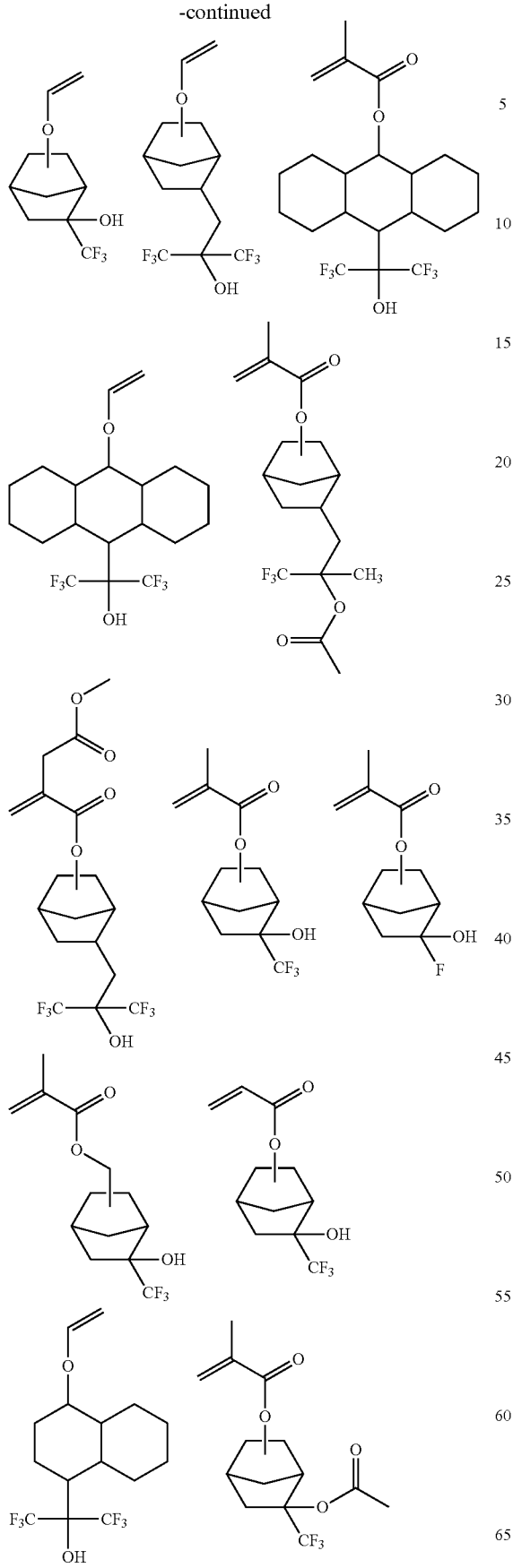
26
-continued
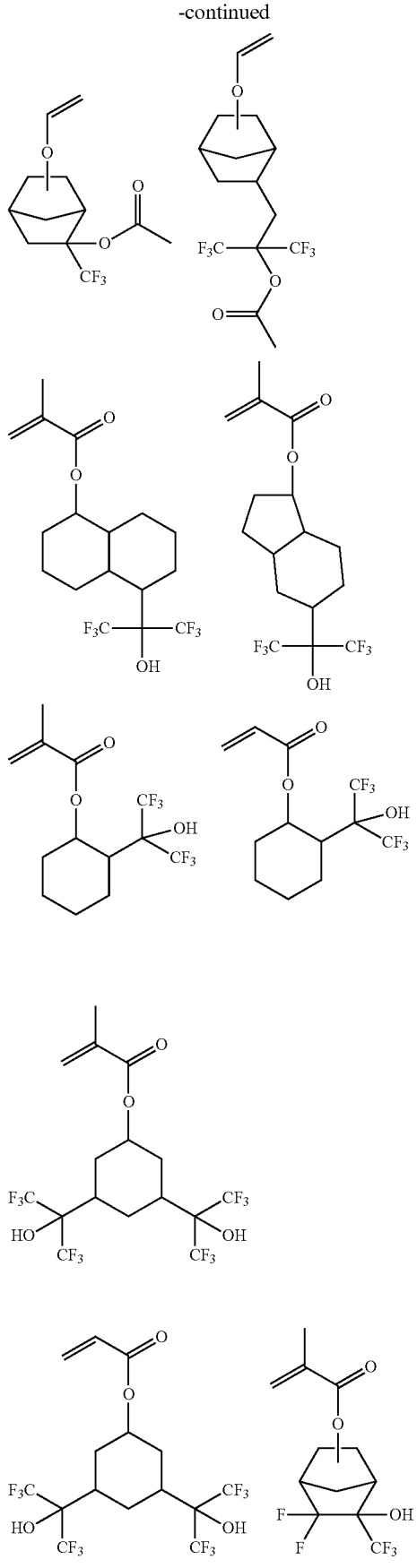

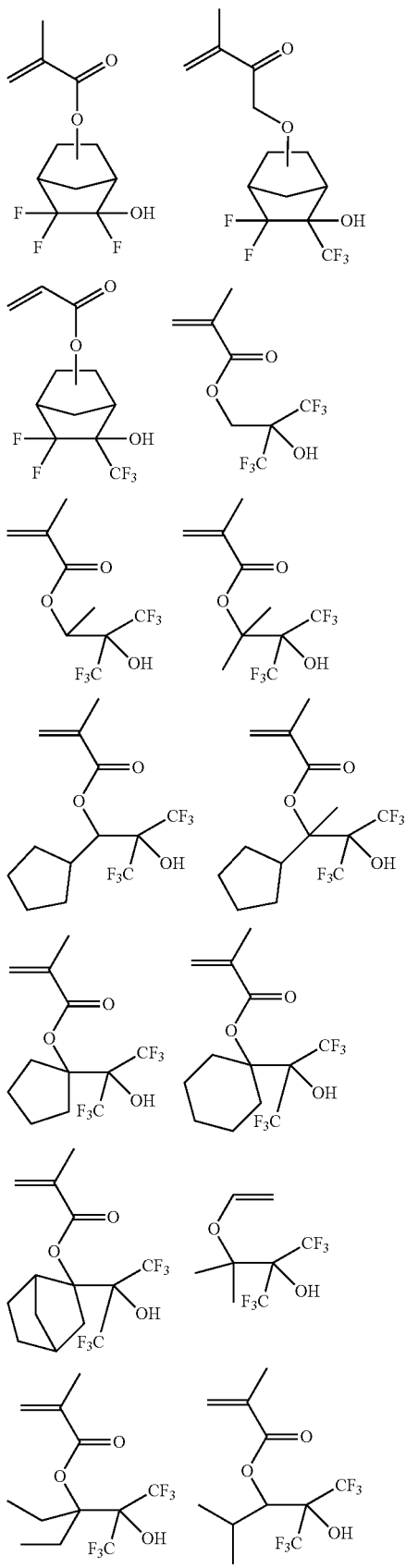
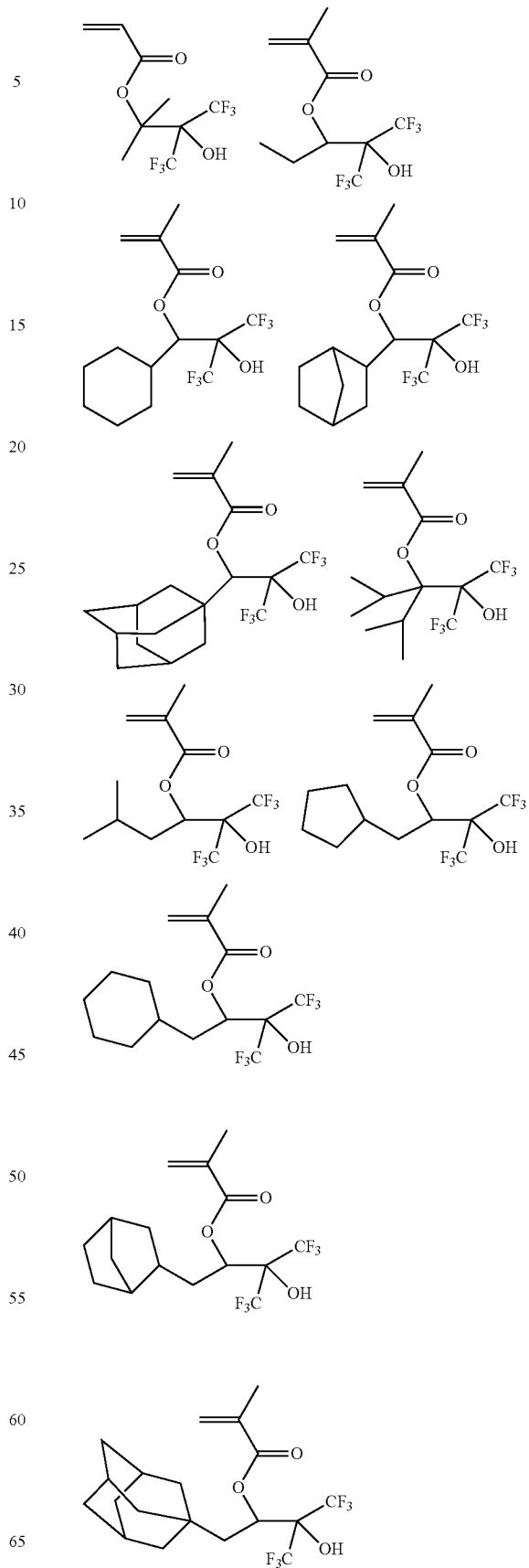

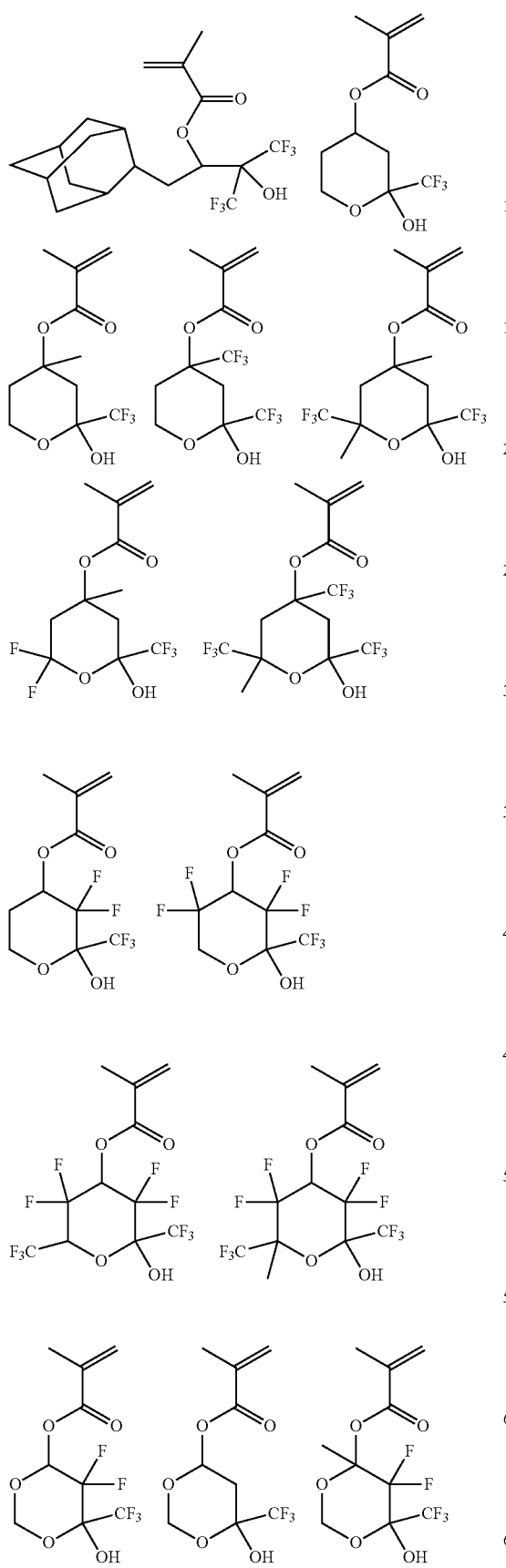
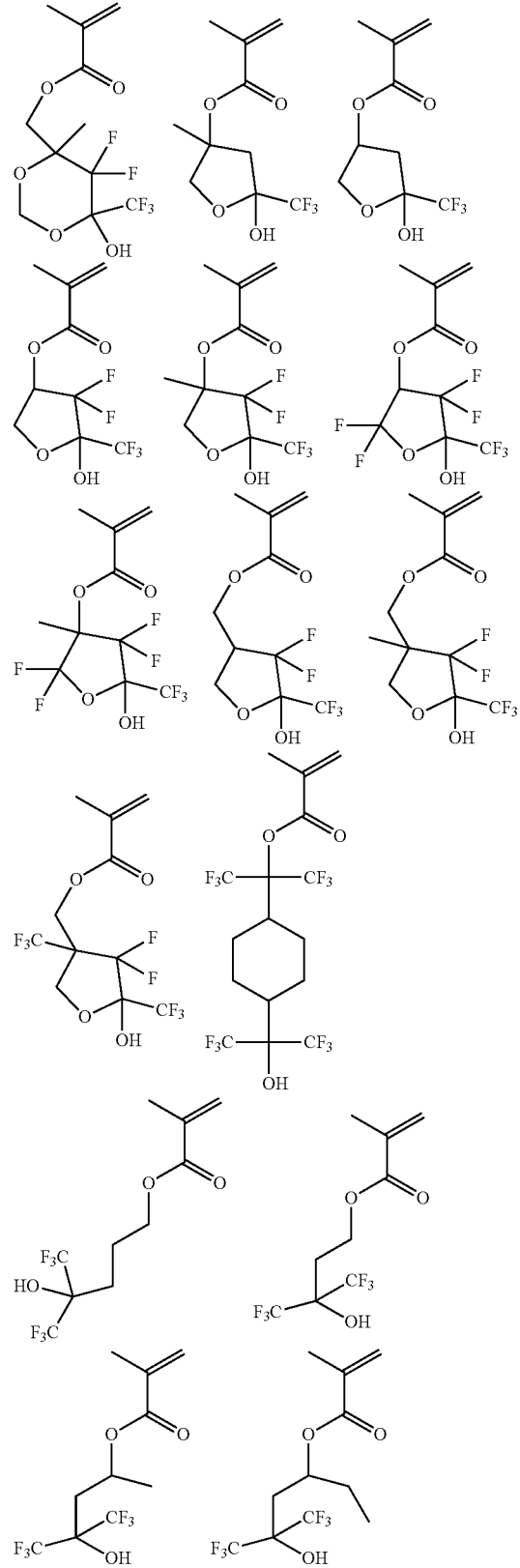
A method for synthesizing the polymer compound for a conductive polymer of the present invention may be shown a method, for example, in which desired monomers among the monomers mentioned above are subjected to polymerization under heating in a solvent by adding a radical polymerization initiator to obtain a polymer compound which is a copolymer.

The solvent to be used at the time of the polymerization may be exemplified by water, methanol, ethanol, n-propanol, isopropyl alcohol, methoxyethanol, ethoxyethanol, n-butanol, ethylene glycol, propylene glycol, glycerol, diethylene glycol, dimethylsulfoamide, dimethylacetamide, acetone, dimethylsulfoxide, N-methyl-pyrrolidone, toluene, benzene, tetrahydrofuran, diethyl ether, dioxane, cyclohexane, cyclopentane, methyl ethyl ketone, and γ-butyrolactone.

The radical polymerization initiator may be exemplified by di-t-butyl peroxide, dicumyl peroxide, t-butylcumyl peroxide, benzoyl peroxide, dilauryl peroxide, cumene hydroperoxide, t-butyl hydroperoxide, t-butyl peroxyisobutyrate, potassium persulfate, ammonium persulfate, aqueous hydrogen peroxide, 2,2'-azobisiso-butyronitrile (AIBN), 2,2'-azobis(2,4-dimethylvalero-nitrile), dimethyl 2,2-azobis(2-methylpropionate), lauroyl peroxide, 2,2'-azobis(2-amidinopropane) dihydrochloride, or an alkali metal salt or an ammonium salt of 4,4'-azobis(4-cyanovaleric acid).

The reaction temperature is preferably 50 to 80° C., and the reaction time is preferably 2 to 100 hours, more preferably 5 to 20 hours.

In the polymer compound for a conductive polymer of the present invention, the monomer providing the repeating unit "a" represented by the general formula (1) may be either one kind or in combination of two or more kinds, and it is preferable to use a methacryl type monomer and a styrene type monomer in combination to heighten polymerizability.

Also, two or more kinds of the monomers providing the repeating unit "a" may be randomly copolymerized, or may be copolymerized in block. When the block copolymerized polymer (block copolymer) is made a conductive film, the repeating unit portions comprising two or more kinds of the repeating units "a"s aggregate to form a sea-island structure, whereby a merit of improving conductivity can be expected.

In addition, the monomer providing the repeating units "a" to "c" may be randomly copolymerized, or may be copolymerized in block. In this case, as in the case of the repeating unit "a", a merit of improving conductivity can be expected by making it a block copolymer.

When the random copolymerization is carried out by the radical polymerization, it is a general method that a monomer(s) to be carried out the copolymerization and a radical polymerization initiator are mixed and polymerized under heating. Polymerization is started in the presence of a first monomer and a radical polymerization initiator, and when a second monomer is added later, one side of the polymer molecule is a structure in which the first monomer is polymerized, and the other side is a structure in which the second monomer is polymerized. In this case, however, the repeating units of the first and second monomers are mixedly present in the intermediate portion, and the form is different from that of the block copolymer. For forming the block copolymer by the radical polymerization, living radical polymerization is preferably used.

In the polymerization method of a living radical called as the RAFT polymerization (Reversible Addition Fragmentation chain Transfer polymerization), the radical at the end of the polymer is always living, so that polymerization is started with the first monomer, and at the stage when it is consumed, by adding the second monomer, it is possible to form a block copolymer by the first and second repeating units. Further, when polymerization is started with the first monomer, and at the stage when it is consumed, the second monomer is added, and then, a third monomer is added, then, a tri-block copolymer can be formed.

When the RAFT polymerization is carried out, there is a characteristic that a narrow dispersion polymer in which a molecular weight distribution (dispersity) is narrow is formed, and in particular, when the RAFT polymerization is carried out by adding the monomer at a time, a polymer having a narrower molecular weight distribution can be formed.

In the polymer compound for a conductive polymer of the present invention, the molecular weight distribution (Mw/Mn) is preferably 1.0 to 2.0, particularly preferably a narrow dispersion of 1.0 to 1.5. If it is a narrow dispersion, it is possible to prevent the conductivity of the conductive polymer synthesized by using the polymer compound from being ununiform.

For carrying out the RAFT polymerization, a chain transfer agent is necessary, and it may be specifically shown 2-cyano-2-propylbenzothioate, 4-cyano-4-phenyl-carbonothioylthiopentanoic acid, 2-cyano-2-propyl dodecyl trithiocarbonate, 4-cyano-4-[(dodecylsulfanylthiocarbonyl)sulfanyl]pentanoic acid, 2-(dodecylthiocarbonothioylthio)-2-methylpropanoic acid, cyanomethyl dodecyl thiocarbonate, cyanomethyl methyl(phenyl)carbamothioate, bis(thiobenzoyl) disulfide, and bis(dodecylsulfanylthiocarbonyl)disulfide. Among these, 2-cyano-2-propylbenzothioate is particularly preferable.

Here, a ratio of the repeating units "a" to "c" is $0<a\leq1.0$, $0\leq b<1.0$, and $0\leq c<1.0$, preferably $0.1\leq a\leq 0.9$, $0.1\leq b\leq 0.9$, and $0\leq c\leq 0.8$, more preferably $0.2\leq a\leq 0.8$, $0.2\leq b\leq 0.8$, and $0\leq c\leq 0.5$.

Incidentally, it is preferable that $a+b+c=1$.

In the method for producing of the polymer compound for a conductive polymer of the present invention, after polymerizing the monomer(s) as described above, the structure of the salt comprising a sulfonamide group bonded to a carbonyl group and lithium, sodium, potassium, or a nitrogen compound is changed to a sulfonamide group bonded to a carbonyl group by ion exchange.

At this time, ion exchange can be carried out by using, for example, an ion exchange resin.

According to the method as shown above, the polymer compound for a conductive polymer containing the repeating unit "a" represented by the general formula (1) can be produced easily.

According to the polymer compound for a conductive polymer of the present invention, it becomes a polymer compound for a conductive polymer which is soluble in an organic solvent, and having a sulfonamide group of a specific super strong acid which can be suitably used as a dopant for a fuel cell or a conductive material.

By using the polymer compound for a conductive polymer for a fuel cell, it is possible to form a material for a fuel cell having a high dielectric constant. In addition, by using it as a dopant for a polymer having conjugated double bonds, it becomes possible to form a conductive film having high transparency, high conductivity and high durability. The polymer compound for a conductive polymer of the present invention has a sulfonamide group of a specific super strong acid, so that it has high ability as a dopant due to strong ionic bonding, and has high stability as an ion. Therefore, when it is used as a conductive material, it shows high conductivity and stability. Further, since it is excellent in solubility in an organic solvent, deterioration of the organic EL device can be prevented by using it for a conductive film for the organic EL lighting.

In addition, according to the method for producing of the present invention, such a polymer compound for a conductive polymer of the present invention can be produced easily.

Example

In the following, the present invention is more specifically explained by referring to Examples, but the present invention is not limited by these.

In the following, the monomers used in the synthesis of Examples are shown,

Monomer 1

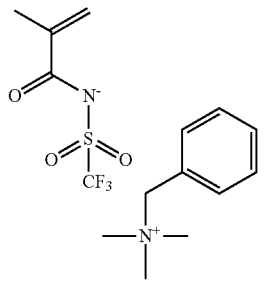

Monomer 2

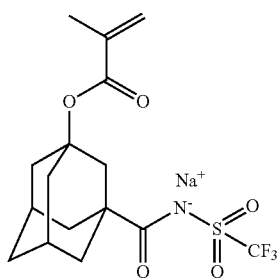

Monomer 3

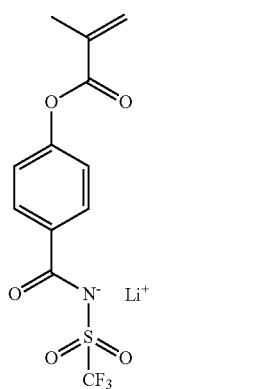

Monomer 4

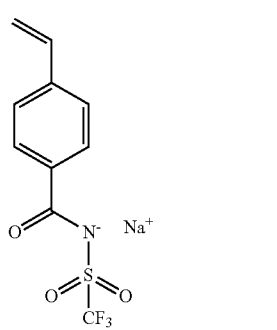

Example 1

Under nitrogen atmosphere, to 37.5 g of methanol stirred at 64° C. were added dropwise a solution of 36.4 g of the monomer 1 and 5.13 g of dimethyl 2,2'-azobis(isobutyrate) dissolved in 112.5 g of methanol over 4 hours. The mixture was further stirred at 64° C. for 4 hours. After cooling the mixture to room temperature, the mixture was added dropwise to 1,000 g of ethyl acetate while vigorously stirring. The formed solid product was collected by filtration, and dried under vacuum at 50° C. for 15 hours to obtain 23.0 g of a white polymer.

The obtained white polymer was dissolved in 912 g of pure water, and the benzyltrimethyl ammonium salt was changed to a sulfonamide group by using an ion exchange resin. When the obtained polymer was measured by using $^{19}$F-NMR, $^{1}$H-NMR, and GPC, the following analytical results were obtained.

Weight average molecular weight (Mw)=35,000

Molecular weight distribution (Mw/Mn)=1.69

This polymer compound is made (Polymer 1),

Polymer 1

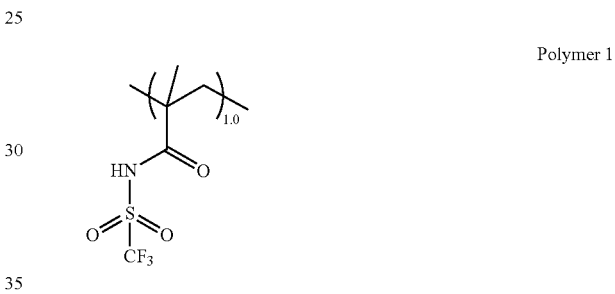

Example 2

Under nitrogen atmosphere, to 37.5 g of methanol stirred at 64° C. were added dropwise a solution of 20.9 g of the monomer 1, 9.5 g of lithium styrene sulfonate and 5.13 g of dimethyl 2,2'-azobis(isobutyrate) dissolved in 112.5 g of methanol over 4 hours. The mixture was further stirred at 64° C. for 4 hours. After cooling the mixture to room temperature, the mixture was added dropwise to 1,000 g of ethyl acetate while vigorously stirring. The formed solid product was collected by filtration, and dried under vacuum at 50° C. for 15 hours to obtain 29.3 g of a white polymer.

The obtained white polymer was dissolved in 912 g of pure water, and the benzyltrimethyl ammonium salt and the lithium salt were changed to a sulfonamide group and a sulfo group, respectively, by using an ion exchange resin. When the obtained polymer was measured by using $^{19}$F-NMR, $^{1}$H-NMR, and GPC, the following analytical results were obtained.

Copolymer compositional ratio (molar ratio) the monomer 1:styrene sulfonic acid=0.5:0.5
Weight average molecular weight (Mw)=41,000
Molecular weight distribution (Mw/Mn)=1.93
This polymer compound is made (Polymer 2), Polymer 2

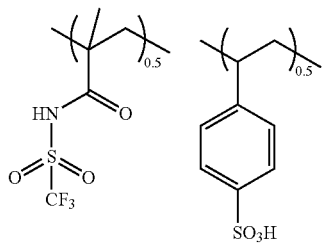

Example 3

Under nitrogen atmosphere, to 37.5 g of methanol stirred at 64° C. were added dropwise a solution of 41.7 g of the monomer 2 and 5.13 g of dimethyl 2,2'-azobis(isobutyrate) dissolved in 112.5 g of methanol over 4 hours. The mixture was further stirred at 64° C. for 4 hours. After cooling the mixture to room temperature, the mixture was added dropwise to 1,000 g of ethyl acetate while vigorously stirring. The formed solid product was collected by filtration, and dried under vacuum at 50° C. for 15 hours to obtain 33.2 g of a white polymer.

The obtained white polymer was dissolved in 912 g of pure water, and the sodium salt was changed to a sulfonamide group by using an ion exchange resin. When the obtained polymer was measured by using $^{19}$F-NMR, $^1$H-NMR, and GPC, the following analytical results were obtained.
Weight average molecular weight (Mw)=49,000
Molecular weight distribution (Mw/Mn)=1.51
This polymer compound is made (Polymer 3), Polymer 3

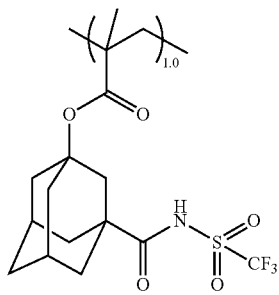

Example 4

Under nitrogen atmosphere, to 37.5 g of methanol stirred at 64° C. were added dropwise a solution of 17.2 g of the monomer 3, 9.5 g of lithium styrene sulfonate and 5.13 g of dimethyl 2,2'-azobis(isobutyrate) dissolved in 112.5 g of methanol over 4 hours. The mixture was further stirred at 64° C. for 4 hours. After cooling the mixture to room temperature, the mixture was added dropwise to 1,000 g of ethyl acetate while vigorously stirring. The formed solid product was collected by filtration, and dried under vacuum at 50° C. for 15 hours to obtain 24.1 g of a white polymer.

The obtained white polymer was dissolved in 912 g of pure water, and the lithium salt was changed to a sulfonamide group and a sulfo group, respectively, by using an ion exchange resin. When the obtained polymer was measured by using $^{19}$F-NMR, $^1$H-NMR, and GPC, the following analytical results were obtained.
Copolymer compositional ratio (molar ratio) the monomer 3:styrene sulfonic acid=0.5:0.5
Weight average molecular weight (Mw)=41,000
Molecular weight distribution (Mw/Mn)=1.63
This polymer compound is made (Polymer 4), Polymer 4

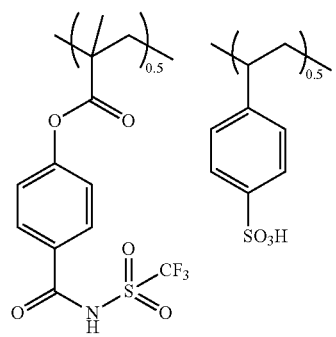

Example 5

Under nitrogen atmosphere, to 37.5 g of methanol stirred at 64° C. were added dropwise a solution of 30.1 g of the monomer 4 and 5.13 g of dimethyl 2,2'-azobis(isobutyrate) dissolved in 112.5 g of methanol over 4 hours. The mixture was further stirred at 64° C. for 4 hours. After cooling the mixture to room temperature, the mixture was added dropwise to 1,000 g of ethyl acetate while vigorously stirring. The formed solid product was collected by filtration, and dried under vacuum at 50° C. for 15 hours to obtain 27.5 g of a white polymer.

The obtained white polymer was dissolved in 912 g of pure water, and the sodium salt was changed to a sulfonamide group by using an ion exchange resin. When the obtained polymer was measured by using $^{19}$F-NMR, $^1$H-NMR, and GPC, the following analytical results were obtained.
Weight average molecular weight (Mw)=38,000
Molecular weight distribution (Mw/Mn)=1.49
This polymer compound is made (Polymer 5), Polymer 5

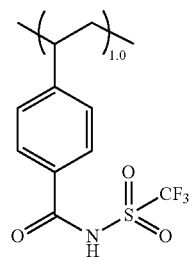

Example 6

Under nitrogen atmosphere, to 37.5 g of methanol stirred at 64° C. were added dropwise a solution of 29.1 g of the monomer 1, 10 g of 3,5-bis(hexafluoro-2-hydroxy-2-propyl)cyclohexyl methacrylate and 5.13 g of dimethyl 2,2'-azobis(isobutyrate) dissolved in 112.5 g of methanol over 4 hours. The mixture was further stirred at 64° C. for 4 hours. After cooling the mixture to room temperature, the mixture was added dropwise to 1,000 g of ethyl acetate while vigorously stirring. The formed solid product was collected by filtration, and dried under vacuum at 50° C. for 15 hours to obtain 37.5 g of a white polymer.

The obtained white polymer was dissolved in 912 g of pure water, and the benzyltrimethyl ammonium salt was changed to a sulfonamide group by using an ion exchange resin. When the obtained polymer was measured by using $^{19}$F-NMR, $^{1}$H-NMR, and GPC, the following analytical results were obtained.

Copolymer compositional ratio (molar ratio) the monomer 1:3,5-bis(hexafluoro-2-hydroxy-2-propyl)cyclohexyl methacrylate=0.8:0.2

Weight average molecular weight (Mw)=36,000

Molecular weight distribution (Mw/Mn)=1.88

This polymer compound is made (Polymer 6),

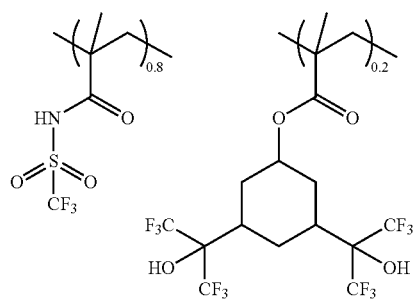

Polymer 6

Example 7

Under nitrogen atmosphere, to 37.5 g of methanol stirred at 64° C. were added dropwise a solution of 29.1 g of the monomer 1, 3.9 g of pentafluorostyrene and 5.13 g of dimethyl 2,2'-azobis(isobutyrate) dissolved in 112.5 g of methanol over 4 hours. The mixture was further stirred at 64° C. for 4 hours. After cooling the mixture to room temperature, the mixture was added dropwise to 1,000 g of ethyl acetate while vigorously stirring. The formed solid product was collected by filtration, and dried under vacuum at 50° C. for 15 hours to obtain 27.5 g of a white polymer.

The obtained white polymer was dissolved in 912 g of pure water, and the benzyltrimethyl ammonium salt was changed to a sulfonamide group by using an ion exchange resin. When the obtained polymer was measured by using $^{19}$F-NMR, $^{1}$H-NMR, and GPC, the following analytical results were obtained.

Copolymer compositional ratio (molar ratio) the monomer 1:pentafluorostyrene=0.8:0.2

Weight average molecular weight (Mw)=36,000

Molecular weight distribution (Mw/Mn)=1.88

This polymer compound is made (Polymer 7),

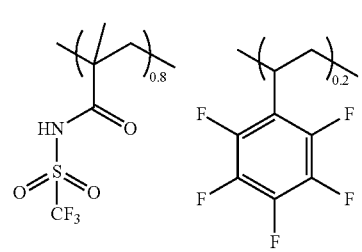

Polymer 7

Example 8

Under nitrogen atmosphere, to 37.5 g of methanol stirred at 64° C. were added dropwise a solution of 29.1 g of the monomer 1, 5.4 g of 4-(hexafluoro-2-hydroxy-2-propyl)styrene and 5.13 g of dimethyl 2,2'-azobis(isobutyrate) dissolved in 112.5 g of methanol over 4 hours. The mixture was further stirred at 64° C. for 4 hours. After cooling the mixture to room temperature, the mixture was added dropwise to 1,000 g of ethyl acetate while vigorously stirring. The formed solid product was collected by filtration, and dried under vacuum at 50° C. for 15 hours to obtain 30.1 g of a white polymer.

The obtained white polymer was dissolved in 912 g of pure water, and the benzyltrimethyl ammonium salt was changed to a sulfonamide group by using an ion exchange resin. When the obtained polymer was measured by using $^{19}$F-NMR, $^{1}$H-NMR, and GPC, the following analytical results were obtained.

Copolymer compositional ratio (molar ratio) the monomer 1:4-(hexafluoro-2-hydroxy-2-propyl) styrene=0.8:0.2

Weight average molecular weight (Mw)=32,000

Molecular weight distribution (Mw/Mn)=1.78

This polymer compound is made (Polymer 8),

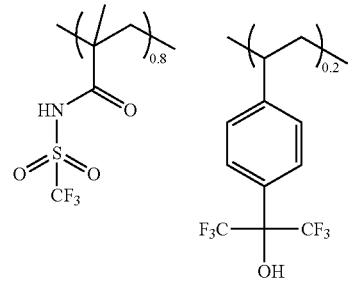

Polymer 8

Polymers 1 to 8 synthesized as shown above were soluble in water, methanol, ethanol, isopropyl alcohol, propylene glycol monomethyl ether, tetrahydrofuran, and dimethylformamide.

Thus, according to the method for producing of the present invention, a polymer compound for a conductive polymer of the present invention which is soluble in an organic solvent and has a sulfonamide group of a specific strong acid can be produced easily.

It must be stated here that the present invention is not restricted to the embodiments shown by Examples. The embodiments shown by Examples are merely examples so that any embodiments composed of substantially the same technical concept as disclosed in the claims of the present invention and expressing a similar effect are included in the technical scope of the present invention.

What is claimed is:

1. A polymer compound for a conductive polymer, the polymer compound comprises:
   one or more repeating units represented by the following general formula (1), and
   one or more repeating units represented by the following general formula (2),
   wherein:
   the polymer compound has a weight average molecular weight in the range of 1,000 to 500,000,
   the general formula (1) is:

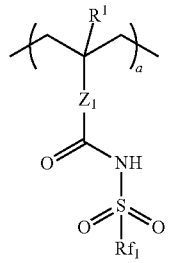
(1)

where:
$R^1$ represents a hydrogen atom or a methyl group;
$Rf_1$ represents a linear or branched alkyl group having 1 to 4 carbon atoms or a phenyl group, and has at least one fluorine atom or a trifluoromethyl group in $Rf_1$;
$Z_1$ represents a single bond, an arylene group having 6 to 12 carbon atoms or —C(=O)—O—$R^2$—;
$R^2$ represents a linear, branched or cyclic alkylene group having 1 to 12 carbon atoms, an arylene group having 6 to 10 carbon atoms or an alkenylene group having 2 to 10 carbon atoms, and may have an ether group, a carbonyl group or an ester group in $R^2$; and
"a" is 0<a≤1.0, and
the general formula (2) is:

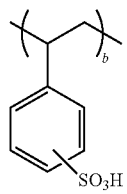
(2)

where "b" is 0<b<1.0.

2. The polymer compound for a conductive polymer according to claim 1, wherein the repeating unit represented by the general formula (1) contains one or more repeating units selected from repeating units represented by the following general formula (3),

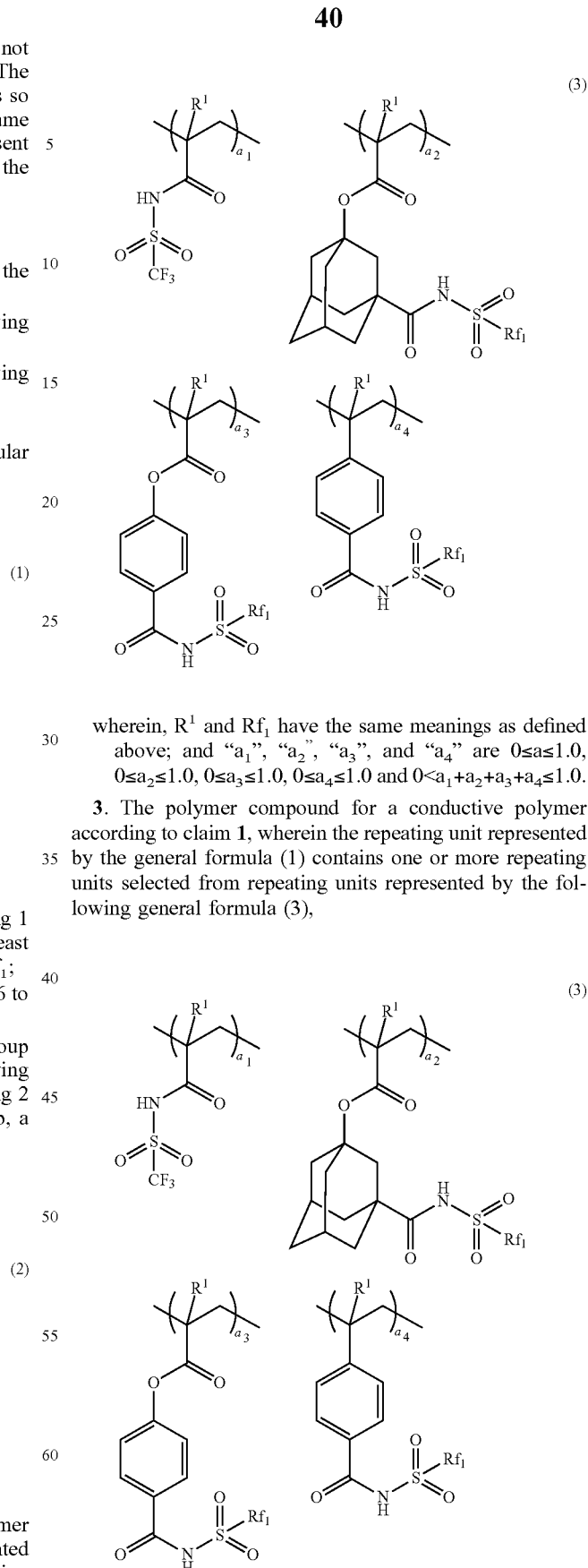
(3)

wherein, $R^1$ and $Rf_1$ have the same meanings as defined above; and "$a_1$", "$a_2$", "$a_3$", and "$a_4$" are 0≤a≤1.0, 0≤$a_2$≤1.0, 0≤$a_3$≤1.0, 0≤$a_4$≤1.0 and 0<$a_1$+$a_2$+$a_3$+$a_4$≤1.0.

3. The polymer compound for a conductive polymer according to claim 1, wherein the repeating unit represented by the general formula (1) contains one or more repeating units selected from repeating units represented by the following general formula (3),

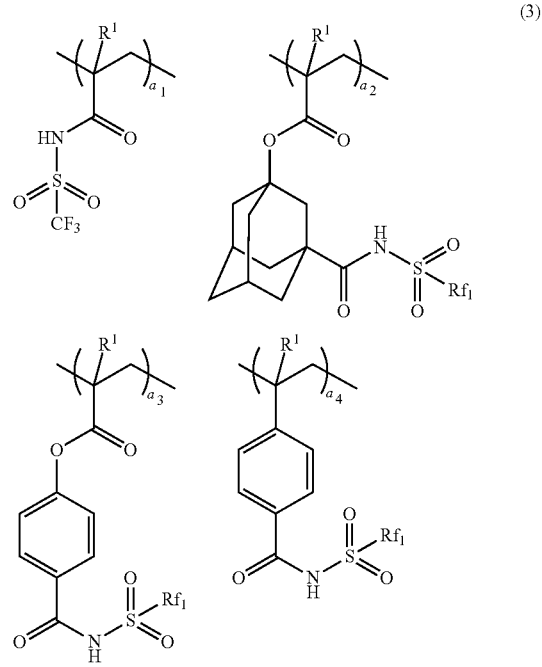
(3)

wherein, $R^1$ and $Rf_1$ have the same meanings as defined above; and "$a_1$", "$a_2$", "$a_3$", and "$a_4$" are $0 \leq a_1 \leq 0.8$, $0 \leq a_2 \leq 1.0$, $0 \leq a_3 \leq 0.5$, $0 \leq a_4 \leq 1.0$ and $0 < a_1+a_2+a_3+a_4 \leq 1.0$.

* * * * *